United States Patent Office 3,578,566
Patented May 11, 1971

3,578,566
PROCESS OF TREATING OIL CONTAINING FERMENTATION DISCHARGES
Manfred Rudel, Markkleeberg, and Anton Gabert, Ulrich Behrens, and Dieter Pohland, Leipzig, Manfred Ringpfeil, Holzhausen, and Karl Sattler, Leipzig, Germany, assignors to Deutsche Akademie der Wissenschaften zu Berlin, Berlin-Aldershof, Germany
No Drawing. Filed Dec. 28, 1967, Ser. No. 694,120
Int. Cl. C12b *1/26*
U.S. Cl. 195—82        12 Claims

ABSTRACT OF THE DISCLOSURE

An oil containing fermentation discharge such as obtained in the aerobic fermentation of petroleum fractions and petroleum-like paraffinic products is subjected in the form of a dispersion of the oil and microorganisms in the nutrient medium to a gravitational field of a sufficient magnitude and for a time sufficient to effect a phase inversion, the fermentation medium and microorganisms in the inverted phase being dispersed in the oil so that the latter forms the external phase of the dispersion, and then effecting the separation of at least part of the oil from the microorganisms. Preferably the microorganism is yeast and the gravitational force is applied by means of a centrifugal field having an acceleration in excess of $10^3$ g; g being the gravity acceleration.

BACKGROUND OF THE INVENTION

In the aerobic fermentation of petroleum fractions such as diesel oil fractions or of similar paraffin-containing products by means of microorganisms, particularly yeasts, the problem arises to process the oil-containing fermentation discharge so as to separate the oil from the microorganisms. Usually the fermentation discharge is an emulsion of yeast and oil in water. To recover the microorganisms from these emulsions is difficult because the emulsions have a high stability and are difficult to break down.

More recently, various processes were proposed for separating and processing the yeast-containing phase and the oil-containing phase. One manner of approach which has been practised is to separate either the entire fermentation liquid or the previously concentrated emulsion by adding surface active agents. Another approach is the extraction by means of organic solvents. The separation method embraces a number of variations. It is possible first to separate and then to add a surface active agent-containing water or a reversed procedure can be followed. It is also possible to add the surface active agent immediately and directly to the product to be separated. In order to increase the separation effect the washing and separation operation has to be carried out several times in alternating succession.

It is also known to carry out the separation in three phases and to wash several times in succession.

The surface active agents used in this process may be anionic or cationic or neutral compounds. If the latter are used, for instance, in the form of saccharose or sucrose esters, they may be retained in the yeast phase since they can be decomposed biologically. It is favorable also in these processes to work with a pH value between 7 and 9 and at elevated temperatures up to 99° C.

All these processes require a rather high input of comparatively large amounts of expensive surface active compounds and also require a substantial investment in the separation apparatus. To obtain a product of high purity multiple operations are necessary. In addition, large amounts of waste liquids are generated in these processes which are very difficult to purify. The processes also involve substantial losses of microorganisms which after all are the desired final product.

SUMMARY OF THE INVENTION

It is therefore an object of the invention to effect the separation of a fermentation discharge as indicated without the usual surface active agents. It is furthermore an object of the invention to carry out such separation without surface active agents and also without requiring complex and repeated washing procedures and nevertheless to obtain a very good separation result.

These and other objects which will appear upon further reading of the specification are accomplished by a process wherein the oil-containing fermentation discharge is subjected in the form of a dispersion of the oil and microorganisms in the nutrient medium to a gravitational field of sufficient magnitude and for a time sufficient to effect a phase inversion, the fermentation medium and microorganisms in the inverted phase then being dispersed in the oil so that the latter forms the external phase of the dispersion. The separation is thereafter effected of at least part of the oil from the microorganisms.

DESCRIPTION OF THE PREFERRED EMBODIMENTS

The gravitational field above referred to is preferably applied in the form of a centrifugal acceleration of high magnitude. For instance, the acceleration may be above $10^3$ g, g being the gravitational acceleration. This treatment will cause the suspension-emulsion of oil and yeast in the nutrient medium to go through a phase inversion in which the oil then forms the external phase, the microorganisms and part of the aqueous nutrient medium being suspended or emulsified in this phase while a substantial portion of the nutrient medium will appear as a new, emulsion-free phase.

It will be understood that the magnitude of the centrifugal acceleration depends also on the period of time for which the treatment is carried out. Thus, it is possible to obtain the desired result with smaller values of $g$ if the process is carried on for a longer period of time. The required time of treatment and the magnitude of the centrifugal acceleration can further be varied by varying the temperature of the fermentation discharge. Thus, an increase of temperature will have a positive effect on the speed at which the phase inversion is reached. An upper limit for the process conditions, is set in the practical application by the point where damage to the microorganisms occurs.

The term "suspension-emulsion" implies any kind of dispersion from a complete suspension to a perfect emulsion.

It was surprising also that the suspension or emulsion phase which was thus formed with oils as external phase was rather unstable as against additional mechanical action. Thus substantial amounts of the external oil phase could be separated until finally an extreme limit value of emulsion was obtained. This border-line emulsion comprised between about 5 and 25 parts of yeast, 75 and 30 parts of water and 20 to 45 parts of oil.

The mechanical action referred to may consist in stirring, filtration or similar operations.

It was furthermore surprising that the emulsion could be broken for good also prior to removing the oil by withdrawing water therefrom. This could be done with the suspension or emulsion first obtained wherein the oil formed the external phase or it could be done in addition to prior mechanical action as just described. The removal of water can be accomplished by use of hydrophilic solvents or the water can be eliminated by evaporation preferably in vacuum. To break the emulsion it is also possible to add highly soluble salts.

The duration of the treatment, the temperature and the amount of acceleration will of course depend on the composition of the discharge. They may all be varied within a broad range. The time may for instance be between 1 sec. to 10 minutes, the temperature may vary between +4° C. to about 90° C. and the acceleration preferably should be above $10^3$ g as above stated with the upper limit being the danger of injury to the microorganisms.

A preferred relationship would be a treatment for about 10 minutes with a centrifugal field of 5.5 times $10^3$ g at room temperature.

The following example will illustrate the invention without limiting its scope:

68.41 g. of the light phase of a discharge obtained from the aerobic fermentation of diesel oil with a yeast of the genus *Candida lipolytica* was subjected for 10 minutes at room temperature to a centrifugal field of the magnitude $5.5 \times 10^3$ g, g being the gravitational acceleration. Through this treatment separation of 26.3% water was obtained which then was eliminated.

The thus formed product was subjected to stirring in a beaker resulting in the separation of oil. In this manner 88.5 weight percent of the oil which was originally present in the lighter phase could be separated.

The pasty residue amounting to about 20 g., was subjected to vacuum distillation in a rotary evaporator at 100 torr (287.5 pound/foot square). There was formed a distillate amounting to 13 g. The yeast was obtained as a dry oil-containing product which could then be freed of the oil in a conventional manner.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A process of treating an oil-containing fermentation discharge, as obtained in the aerobic fermentation of petroleum fractions and petroleum-like paraffinic products, comprising subjecting the discharge which is in the form of a suspension or emulsion of an oil and microorganisms in an aqueous nutrient medium to a centrifugal force of at least $10^3$ g for a time sufficient to effect a phase inversion, to produce an unstable suspension or emulsion in which the oil forms the external phase, the microorganisms and apart of the aqueous nutrient medium is suspended or emulsified in this phase while a substantial portion of the nutrient medium appears as a new, emulsion-free phase, and then effecting the separation of at least part of the oil from the microorganisms.

2. The process of claim 1 wherein the fermentation discharge is obtained from the aerobic fermentation of heavy fuel oil.

3. The process of claim 1 wherein the microorganisms are yeasts.

4. The process of claim 1 wherein a predetermined time-acceleration relation is observed, an increase in the centrifugal force resulting in a decrease of the time of the treatment.

5. The process of claim 1 wherein the treatment is effected at an elevated temperature.

6. The process of claim 1 wherein the suspension or emulsion obtained is subjected to further mechanical action to remove portions of the oil forming the external phase and finally forming a border-line emulsion.

7. The process of claim 6 wherein the border line emulsion comprises 5 to 25 parts of yeast, 75 to 30 parts of water and 20 to 45 parts of oil.

8. The process of claim 1 wherein the inverted phase suspension or emulsion is broken by removal of water.

9. The process of claim 8 wherein the water is removed by adding hydrophilic agents.

10. The process of claim 8 wherein the water is removed by evaporation.

11. The process of claim 8 wherein the water is removed by the addition of a salt.

12. The process of claim 6 wherein the border-line emulsion is obtained after the additional mechanical action is broken by removal of water.

References Cited

UNITED STATES PATENTS

| | | | |
|---|---|---|---|
| 2,365,256 | 12/1944 | Edvarsson | 252—347 |
| 3,264,196 | 8/1966 | Filosa | 195—3H |
| 3,268,412 | 8/1966 | Champagnat et al. | 195—3H |

A. LOUIS MONACELL, Primary Examiner

S. RAND, Assistant Examiner

U.S. Cl. X.R.

195—28; 252—347, 349